June 6, 1939.  W. D. HAINES  2,161,705
AGRICULTURAL MACHINE
Filed Oct. 5, 1937   2 Sheets-Sheet 1
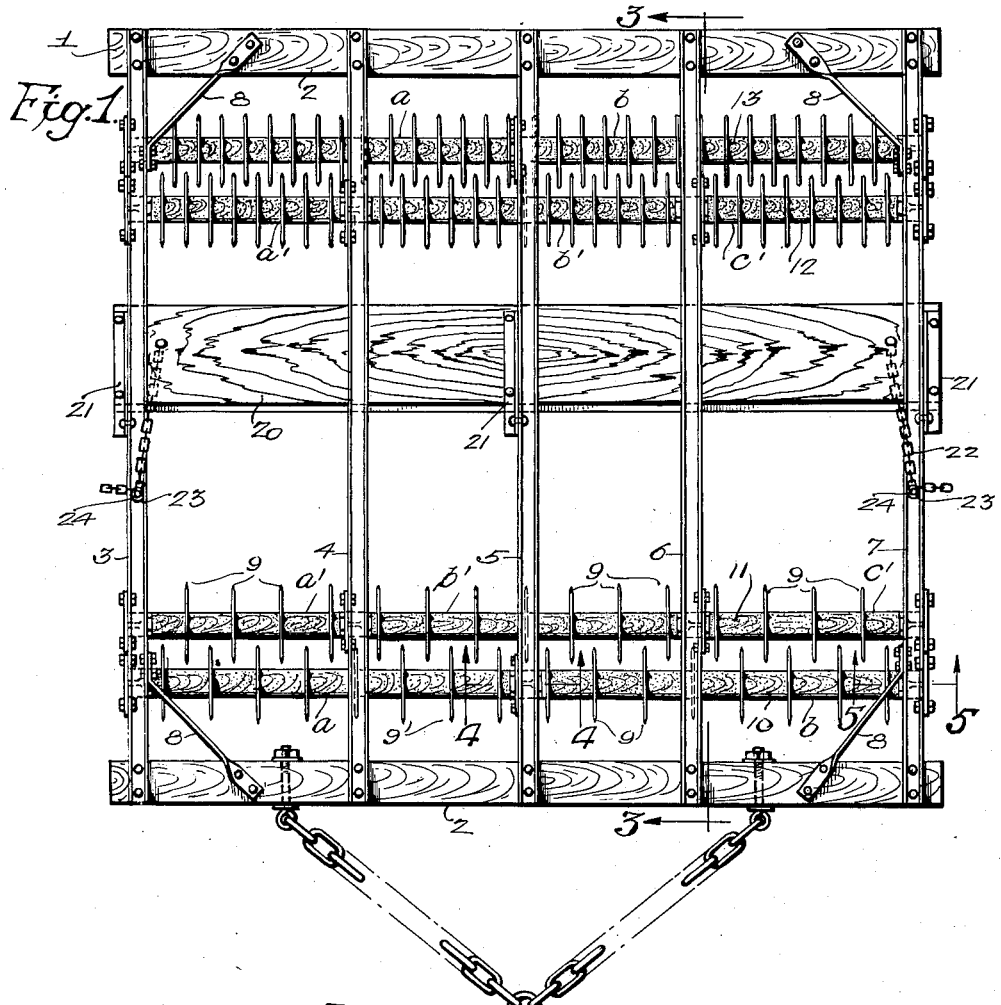

June 6, 1939. W. D. HAINES 2,161,705
AGRICULTURAL MACHINE
Filed Oct. 5, 1937 2 Sheets-Sheet 2

Inventor:—
William D. Haines
by his Attorneys
Howson & Howson

Patented June 6, 1939

2,161,705

UNITED STATES PATENT OFFICE 2,161,705

AGRICULTURAL MACHINE

William D. Haines, Haddonfield, N. J., assignor of one-half to Morris M. Serata, Bridgeton, N. J.

Application October 5, 1937, Serial No. 167,461

6 Claims. (Cl. 55—23)

This invention relates to new and useful improvements in agricultural machines, and more particularly to agricultural machines of the type commonly known as harrows.

The principal object of the invention is to provide an agricultural machine of the character described which may be employed to till or harrow the soil or earth over which it travels in such manner that the surface of the soil or earth is left in a finished relatively level or smooth condition ready for planting or seeding.

Another object of the invention is to provide a device of the stated character which is of rugged, relatively simple construction and comparatively inexpensive to manufacture.

A more specific object of the invention is to provide a device of the character set forth wherein means is provided for performing what may be termed primary and secondary harrowing operations upon the soil and including novel means for levelling off the surface of the soil between such primary and secondary harrowing operations.

These and other objects of the invention, and the features and details of its construction and operation are set forth hereinafter and shown in the accompanying drawings, in which Figure 1 is a top plan view of a harrow made according to the present invention.

Figure 2 is a view in end elevation of the disclosure in Figure 1.

Figure 3:
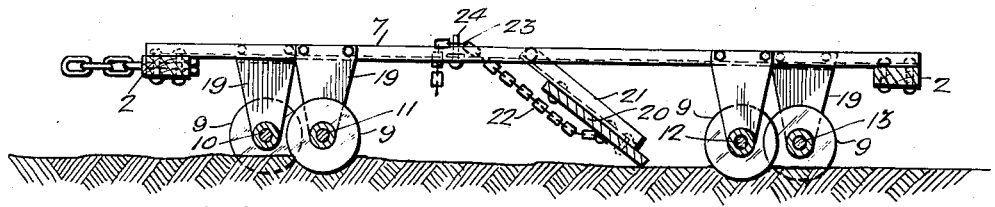
Figure 3 is a view in section on line 3—3, Figure 1.

Referring now more particularly to the drawings, reference numeral 1 designates generally the framework of an agricultural machine made in accordance with the invention and in the present instance this frame comprises front and rear transverse end elements 2 which are connected together in relatively spaced parallel relation by means of a plurality of longitudinally extending upwardly opening channel members 3, 4, 5, 6 and 7 arranged in spaced parallel relation so that the members 3 and 7 form the sides of the frame 1 and the member 5 extends centrally thereof, suitable braces or struts 8 being secured angularly across the several corners of said frame 1 to strengthen the same and impart rigidity thereto.

The primary harrowing or tilling operation is performed by means of a series of coulter harrow elements 9 of annular disk form arranged in suitably spaced relation upon a pair of transversely arranged parallel shafts 10 and 11 mounted adjacent the forward or front end of the frame 1 of the machine. The harrow elements 9 are preferably equally spaced with respect to one another upon each of the shafts 10 and 11 and arranged so that the elements 9 on one of said shafts are disposed in staggered relation with respect to the harrow elements on the other shaft, and reside substantially midway therebetween in slightly lapping relation with respect thereto as best illustrated in Figure 3 of the drawings. On the other hand, the secondary harrowing operation is performed by means of a series of like harrow elements 9 arranged upon a pair of transversely arranged parallel shafts 12 and 13 mounted adjacent the rear end of the frame 1 of said machine, said harrow elements 9 being arranged upon said shafts 12 and 13 in a manner similar to that described in connection with the shafts 10 and 11 except that the space provided between adjacent elements 9 on each shaft 12 and 13 is preferably one-half that provided between adjacent elements 9 on the shafts 10 and 11 as illustrated in Figure 1 of the drawings.

The several shafts 10, 11, 12 and 13 are each composed of a plurality of aligned shaft sections for the purpose of providing a differential action therein to permit the machine to be drawn through arcs of relatively small radii, and in the form of the device illustrated in Figures 1 and 2 of the drawings, the shafts 10 and 13 each comprise two aligned sections $a$ and $b$ respectively whereas the inner shafts 11 and 12 each comprise three aligned sections $a'$, $b'$ and $c'$ respectively. The several coulter harrow elements 9 in each instance are maintained in the aforementioned spaced relationships upon each shaft section by means of sleeves 14 composed of any suitable lightweight material such as, for example, wood, and the opposite end portions of each aligned section of the several shafts 10, 11, 12 and 13 are threaded as indicated at 15 to receive nuts or the like 16 for the purpose of firmly clamping together the several elements 9 and alternate spacing sleeves 14 on each shaft section so that they will rotate together as a unit with such shaft section. These nuts 16 are secured upon the threaded portions 15 of the shaft sections as tightly as possible and usually do not become loose or unscrewed as a result of ordinary use of the machine but, if desired, suitable openings may be provided in said nuts 16 and portions 15 for the reception of a cotter pin or the like.

Figure 4:
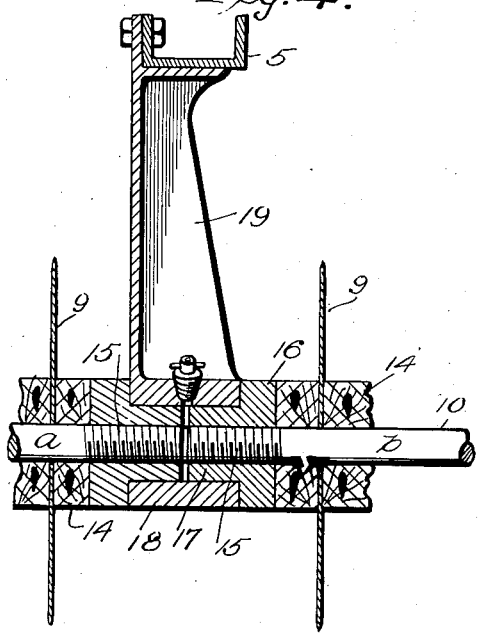
Figure 4 is an enlarged view in section on line 4—4, Figure 1.
Figure 5:
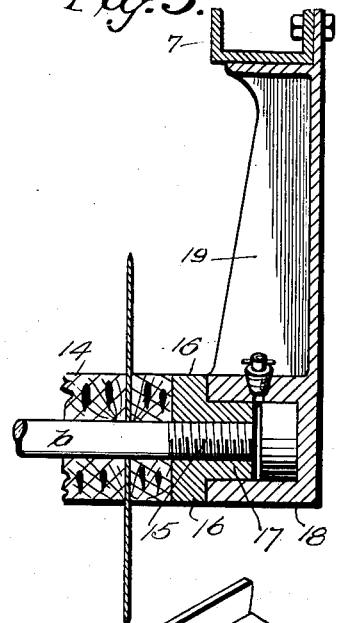
Figure 5 is an enlarged fragmentary view in section taken on line 5—5, Figure 1.

As shown particularly in Figures 4 and 5 of the drawings, the nuts or like elements 16 include outwardly projecting axial bearing portions 17 which are rotatably mounted in the lower sleeve portions 18 of a number of brackets 19 secured to and depending from the longitudinal members 3, 4, 5, 6 and 7 of the frame 1 of the machine. The axially projecting bearing portions 17 of the nuts 16 constitute bearings or journals at opposite ends of each section of the several shafts 10, 11, 12 and 13 and the sleeve portions 18 of the depending brackets 19 have an axial length sufficient to receive both projecting bearing portions 17 of the nuts 16 on adjacent ends of adjacent shaft sections as shown in Figure 4 of the drawings. The inner adjacent ends of the two aligned sections a and b comprising each shaft 10 and 13 are both supported in the sleeve portion 18 of brackets 19 secured to and depending from the central longitudinal frame member 5 while the outer ends of said sections a and b of shafts 10 and 13 are similarly supported by brackets 19 secured respectively to the outermost longitudinal frame members 3 and 7. On the other hand, the opposite ends of the three shaft sections a', b' and c' comprising the inner shafts 11 and 12 are supported in like manner from the longitudinal frame members 3 and 4, 4 and 6 and 6 and 7 respectively.

For the purpose of providing a relatively finished surface to the earth a member 20 is suspended transversely of the machine intermediate the shafts 11 and 12 by means of brackets 21 which are pivoted at their upper ends to the longitudinal members 3, 5 and 7 respectively of the frame 1, the arrangement being such that the lower edge of said member engages and scrapes along the surface of the earth by virtue of its own weight and the action of gravity thereon. In order that levelling or finishing of the surface of the ground may be regulated as desired, chains 22 composed of a succession of open links 23 are connected to the forward face of the member 20 and are of such length that a plurality of the links 23 may be selectively engaged by pins 24 secured in an upstanding position in or upon the outer side members 3 and 7 of the frame, thus by engaging different links 23 of said chains 22 over said pins 24, the chains 22 may be tightened or loosened to respectively increase or decrease pressure of the member 20 upon the surface of the soil desired.

Figure 6:
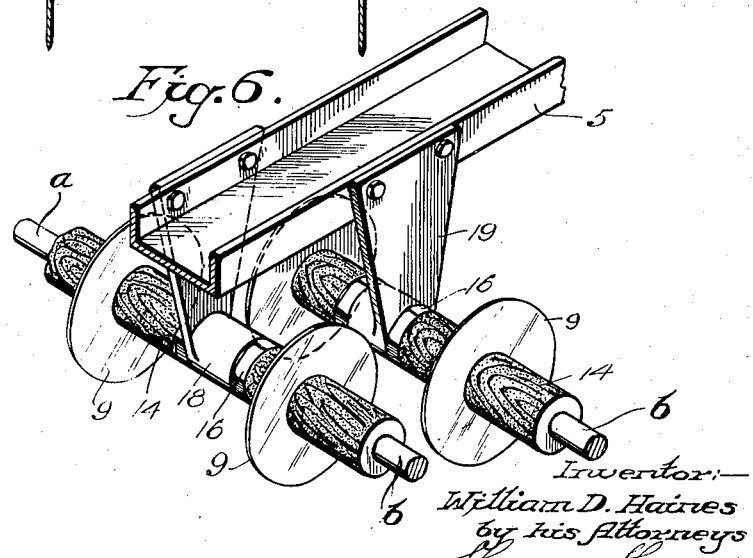
Figure 6 is a detached fragmentary view in perspective showing a modified arrangement of the coulter shafts and their bearings in another form of the invention.

As previously illustrated and described the inner shafts 11 and 12 each comprise three aligned shaft sections a', b' and c'. Such an arrangement is not, however, essential and if desired said shafts may each comprise but two aligned shaft sections a and b as in the case of the outer shafts 10 and 13 in which event the bearing portions 17 of the nuts 16 on the inner adjacent ends of the sections a and b of each shaft 11 and 12 are rotatably mounted in the sleeve portion 18 of a bracket 19 secured to and depending from the central longitudinal member 6 of the frame 1 as in the case of the inner adjacent ends of the outer shafts 10 and 13. However, so as not to interfere with the staggered relation and spacing of the coulter elements 9 on each of the shafts 10, 11, 12 and 13, the central bearing brackets 19 for the inner adjacent ends of the sections a and b of shafts 11 and 12 are secured to and depend from the side or face of the central longitudinal channel member 6 opposite that to which the central bearing brackets 19 for the ends of the sections of shafts 10 and 13 are secured, as shown in Figure 6 of the drawings.

While particular embodiments of the invention have been illustrated and described herein, it is not intended that said invention be precisely limited to such disclosures, but that changes and modifications may be made and incorporated therein within the scope of the annexed claims.

I claim:

1. In an agricultural machine of the character described, a harrow assembly comprising a plurality of aligned shafts, a plurality of disk and sleeve elements alternately arranged on each of said shafts substantially throughout the length thereof, bearing elements threaded on opposite ends of each shaft for the purpose of firmly clamping said disk and sleeve elements together for rotation with each of said shafts as a unit, brackets including sleeve portions constructed and arranged to rotatably receive the bearing elements at the outer ends of said series of aligned shafts, and other brackets including sleeve portions arranged to rotatably receive both bearing elements at adjacent ends of adjacent shafts in said series.

2. An agricultural machine of the character described comprising a plurality of soil harrowing elements each including a shaft, a plurality of disk and sleeve elements alternately arranged on said shaft substantially throughout the length thereof, bearing elements threaded on opposite ends of the shaft for the purpose of firmly clamping said disk and sleeve elements together for rotation with said shaft as a unit, a frame structure, brackets secured to and depending from said frame structure for rotatably supporting said shafts and harrow members transversely beneath the frame structure in a plurality of aligned parallel groups, and a member pivoted to said frame and extending transversely thereof between said groups of aligned shafts and arranged to engage and level-off the surface of the soil.

3. An agricultural machine of the character described comprising a plurality of soil harrowing elements each including a shaft, a plurality of disk and sleeve elements alternately arranged on said shaft substantially throughout the length thereof, bearing elements threaded on opposite ends of the shaft for the purpose of firmly clamping said disk and sleeve elements together for rotation with said shaft as a unit, a frame structure, brackets secured to and depending from said frame structure for rotatably supporting said shafts and harrow members transversely beneath the frame structure in a plurality of aligned parallel groups, a member pivoted to said frame and extending transversely thereof between said groups of aligned shafts and arranged to engage and level-off the surface of the soil, and means for adjusting the last mentioned member at will to control the levelling thereof.

4. An agricultural machine of the character described comprising a frame structure, a plurality of soil harrowing elements each including a shaft section having a series of disks secured thereon in predetermined spaced relation, and brackets secured to and depending from said frame structure and independently supporting said shaft sections for rotation in a plurality of aligned groups to afford a differential action between adjacent shaft sections of the same group and permit the machine to travel through arcs of small radii, said aligned groups of shaft sections extending transversely below the frame structure in relatively spaced parallel relation.

5. An agricultural machine of the character described comprising a frame structure, a plurality of soil harrowing elements each including a shaft section having a series of disks secured thereon in predetermined spaced relation, brackets secured to and depending from said frame structure and independently supporting said shaft sections for rotation in a plurality of aligned groups to afford a differential action between adjacent shaft sections of the same group and permit the machine to travel through arcs of small radii, said aligned groups of shaft sections extending transversely below the frame structure in relatively spaced parallel relation, and a member pivoted to said frame and extending transversely therebelow between two of said groups of shaft sections to engage and level off the surface of the soil.

6. An agricultural machine of the character described comprising a frame structure, a plurality of soil harrowing elements each including a shaft section having a series of disks secured thereon in predetermined spaced relation, brackets secured to and depending from said frame structure and independently supporting said shaft sections for rotation in a plurality of aligned groups to afford a differential action between adjacent shaft sections of the same group and permit the machine to travel through arcs of small radii, said aligned groups of shaft sections extending transversely below the frame structure in relatively spaced parallel relation, a member pivoted to said frame and extending transversely therebelow between two of said groups of shaft sections to engage and level off the surface of the soil, and means for adjusting the last mentioned member at will to control the levelling action thereof.

WM. D. HAINES.